(12) United States Patent
Ishida

(10) Patent No.: US 6,729,193 B2
(45) Date of Patent: May 4, 2004

(54) LOAD DETECTION STRUCTURE IN A SLIDING SEAT

(75) Inventor: Toshiaki Ishida, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/290,173

(22) Filed: Nov. 8, 2002

(65) Prior Publication Data
US 2003/0177847 A1 Sep. 25, 2003

(51) Int. Cl.[7] ............................................. G01L 1/22
(52) U.S. Cl. ............................. 73/862.627; 73/862.474
(58) Field of Search ..................... 73/862.627, 862.474, 73/832.338

(56) References Cited

U.S. PATENT DOCUMENTS

| 6,069,325 | A  | * | 5/2000 | Aoki ......................... 177/136 |
| 6,448,512 | B1 | * | 9/2002 | Cooper ....................... 177/144 |
| 6,571,647 | B1 | * | 6/2003 | Aoki et al. ............. 73/862.381 |
| 6,612,614 | B2 | * | 9/2003 | Wolfe ................... 73/862.634 |

FOREIGN PATENT DOCUMENTS

| JP | 11-304579 | 10/1999 |
| JP | 11-1153   | 4/2000  |

* cited by examiner

Primary Examiner—Edward Lefkowitz
Assistant Examiner—Lilybett Martir
(74) Attorney, Agent, or Firm—Browdy and Neimark, P.L.L.C.

(57) ABSTRACT

A load detection structure for a vehicle seat provided with a pair of spaced-apart slide rail devices, wherein a strain block element with a strain gauge is provided on a lateral wall of an upper rail of each of the two slide rail devices. A vertically elongated hole is formed in that lateral wall. The strain block element has a movable end portion and a securing portion fixedly secured to the upper rail lateral wall. A pair of spaced-apart pendent link pieces are provided between the seat and the strain block element, such that the movable end portion of strain block element is connected with the seat via those two spaced-apart pendent link pieces and a connecting pin that passes slidably through the vertically elongated hole, so that the strain block element is delectable in substantially a vertical direction within the vertical limit range defined by the vertically elongated hole.

7 Claims, 3 Drawing Sheets

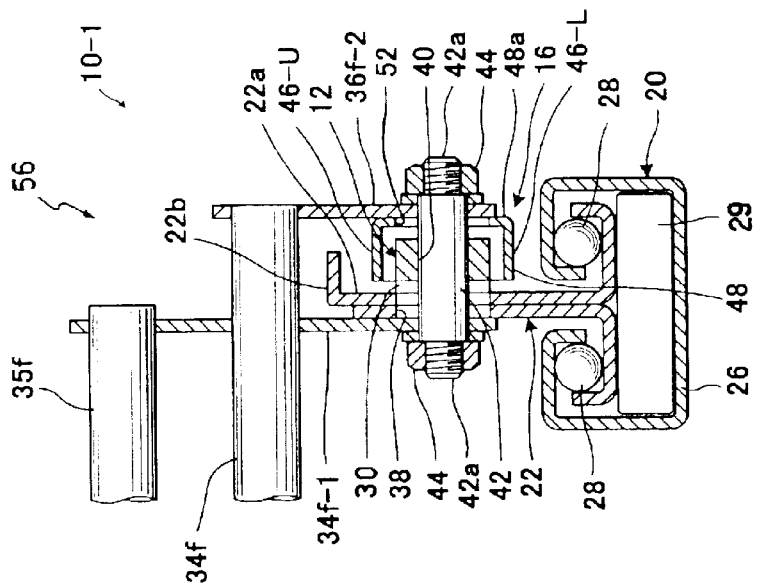
FIG. 6
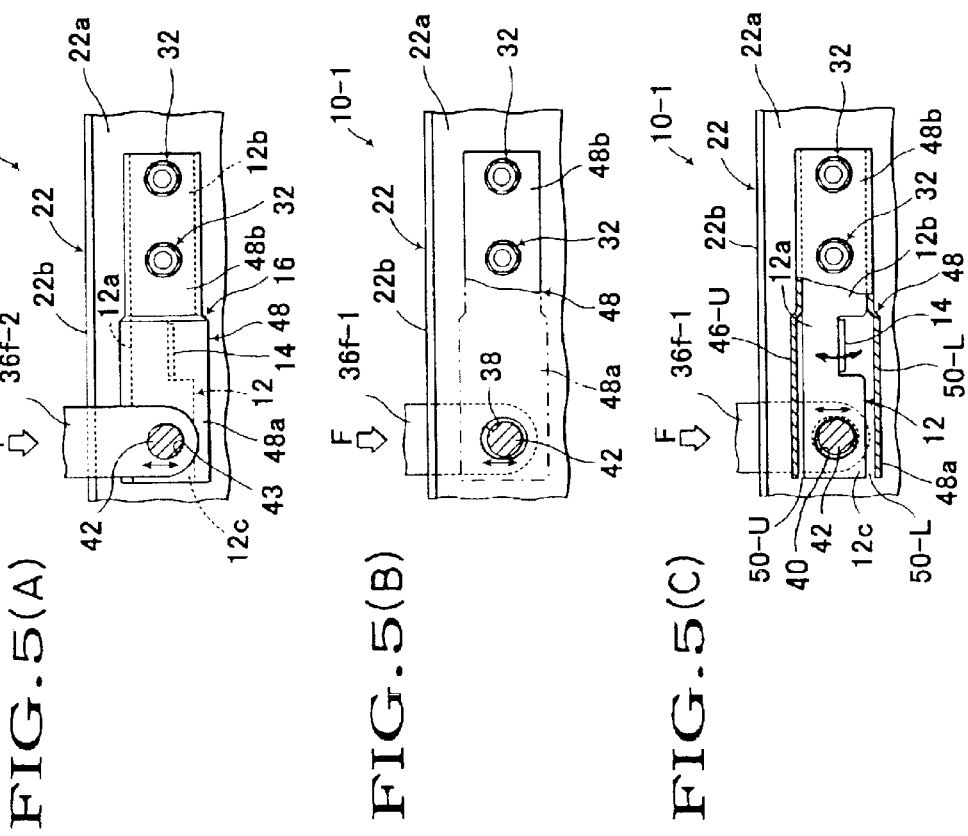
FIG.5(A)
FIG.5(B)
FIG.5(C)

LOAD DETECTION STRUCTURE IN A SLIDING SEAT

BACKGROUND OF INVENTION

1. Field of the Invention

The present invention relates to a structure allowing for detection of a load applied to a vehicle seat. In particular, the invention is directed to such load detection structure for use in a slidable type of vehicle seat, or the so-called "sliding seat" which are equipped with a pair of spaced-apart slide rails for allowing the seat to move in fore-and-aft direction, wherein a load detection element is mounted between the seat and the two slide rails.

2. Description of Prior Art

There have been known a passenger detection system for detecting the presence and absence of a passenger or driver in a seat of vehicle in advance before actuating or stopping the associated mechanical elements to automatically control various functions and mechanisms built in the seat.

Normally, the passenger detection system employs various sensors (e.g. a pressure sensitive element) which detect the weight of a passenger on a seat and emit a signal to electronic control systems for automatic control of various mechanical elements related to the seat. Most of the sensors are of a simple structure which can only sense the presence and absence of passenger on a seat, but the recent high-tech control technology inevitably requires that the sensors should further detect whether the passenger is an adult or a child as with an air bag control system for instance.

To meet the demand, there have been proposed sensor systems for numerically detecting the weight of passenger or a corresponding load applied to the seat, determining whether the passenger is adult or child, according to a numerical data obtained, and then controlling and adjusting the associated mechanical elements to optimal conditions suited for the adult or child (e.g. controlling air bag), as disclosed from the Japanese Laid-Open Patent Publications No. 11-304579 for instance. As known form such publication, a load applied to the seat is detected by load sensor which includes one mode of sensor for directly sensing the load or another mode of sensor using a deformable material which directly receives the load and a strain gauge for detecting a degree of deformation of that deformable material, to thereby detect a precise load applied to the seat. In any case, the sensors directly receives a load applied to the seat and therefore it is required that a load detection system should be provided with a high sensitivity to precisely detect a weight of any person in a wide range including children and adults, and further the load detection system be provided with a high protection against an overload due to such an emergency accident as a collision.

As widely known, most of vehicle or automotive seats are equipped with a pair of spaced-apart slide rails (or seat slide device) at the bottom side thereof, constituting what is called "sliding seat" which is slidable via the two slide rails in the fore-and-aft direction. It is a main or common practice to mount the foregoing passenger detection system to such slide rails. According to the Japanese Pub. No. 11-304579 stated above, the sensors and the associated mechanisms have to be mounted either upon or below the two slide rails. In particular, if those sensors and mechanism are mounted below the slide rails, it will be necessary to provide a special space below the slide rails, in which to accommodate them. As a result, the seat on the whole is raised to an undesired level resulting in heightening a seating level where a seat occupant sits on the seat.

SUMMARY OF THE INVENTION

In view of the above-stated drawbacks, it is therefore a primary purpose of the present invention to provide an improved load detection structure which can be installed in the seat without increasing the height of the seat.

In order to achieve such purpose, the load detection structure of the present invention is basically comprised of:

a load detection means for detecting a load applied to a vehicle seat, the load detection means including:

a block element of a generally oblong shape having a rigid yet resiliently deflectable property that tends to recover into its original shape, the block element having a movable portion; a securing portion; and a deflectable area defined between the movable portion and securing portion, wherein the movable portion is formed with a horizontally elongated hole therein; and a strain gauge means provided on the deflectable area;

the load detection means being arranged laterally of the upper rail such that the securing portion of block element is fixedly secured to the lateral side of upper rail;

a vertically elongated hole formed in the lateral wall of upper rail;

a connecting pin; and a pair of spaced-apart link pieces so provided below the seat as to extend downwardly therefrom, with such an arrangement that the pair of spaced-apart link pieces being disposed symmetrically relative to and on the opposite sides of both upper rail and movable portion of block element, wherein one of the pair of spaced-apart link pieces being connected with another of the pair of spaced-apart link pieces in such a manner that said connecting pin is secured in the hole of movable portion while being slidably inserted through the vertically elongated hole, and wherein the pair of spaced-apart link pieces are supported by the movable portion of block element so that a load applied to the seat is transmitted to the movable portion, thereby causing deflection of the delectable area of block element, in response to which, the strain gauge means detects an amount of the deflection.

Accordingly, since the load detection means is located at the lateral side of the upper rail, any other element for supporting the load detection means is not interposed between the seat and two slide rail devises, thereby avoiding undesired increase in height of the seat.

In one aspect of the present invention, the load detection structure may further includes a pair of first and second limit pieces, which are respectively defined at a point adjacent to one side of the movable portion of block element with a first gap therebetween and at another point adjacent to another side of the movable portion with a second gap therebetween, the pair of first and second limit elements being adapted to limit the vertical movement of the movable portion of block element, while allowing such vertical movement within a limited space including the first and second gaps.

In another aspect of the invention, the load detection structure may include a limiter member of generally channel cross-section having first and second horizontal portions formed therein and being so configured as to cover the block element, and the foregoing first and second limit pieces may respectively be formed integrally in said first and second horizontal portions, and wherein the limiter member is securely connected with the lateral side of upper rail, covering the block element.

In yet another aspect of the invention, the load detection structure may further include a link assembly comprising four spaced-apart link elements in a generally rectangular shape having four corner portions, and such link assembly may be provided between the seat and the pair of spaced-apart slide rail devices, with such an arrangement that the load detection means are connected integrally with the four corner portions of the link assembly, while being disposed at one end portion of each of the two slide rail devices and disposed also at another opposite end portion of each of the two slide rail devices.

Other features and advantages will become apparent from reading of the description hereinafter, with reference to the annexed drawings.

BRIEF DESCRIPTION OF THE DRAWINGS

FIG. 5(A) is a partly broken fragmentary side view of a principal part of the load detection structure, which particularly shows a connection between a strain block member and one of a pair of pendent link pieces;

FIG. 5(B) is a partly broken fragmentary side view of the principal part of the load detection structure, which particularly shows a connection between another of the pair of pendent link pieces and an upper rail;

FIG. 5(C) is a partly broken fragmentary side view of the principal part of the load detection structure, which particularly illustrates vertical deflection of the strain block member; and FIG. 6 is a schematic cross-sectional view of the principal part of the load detection structure and a slide rail device.

DETAILED DESCRIPTION OF PREFERRED EMBODIMENT OF THE INVENTION

Figure 1:
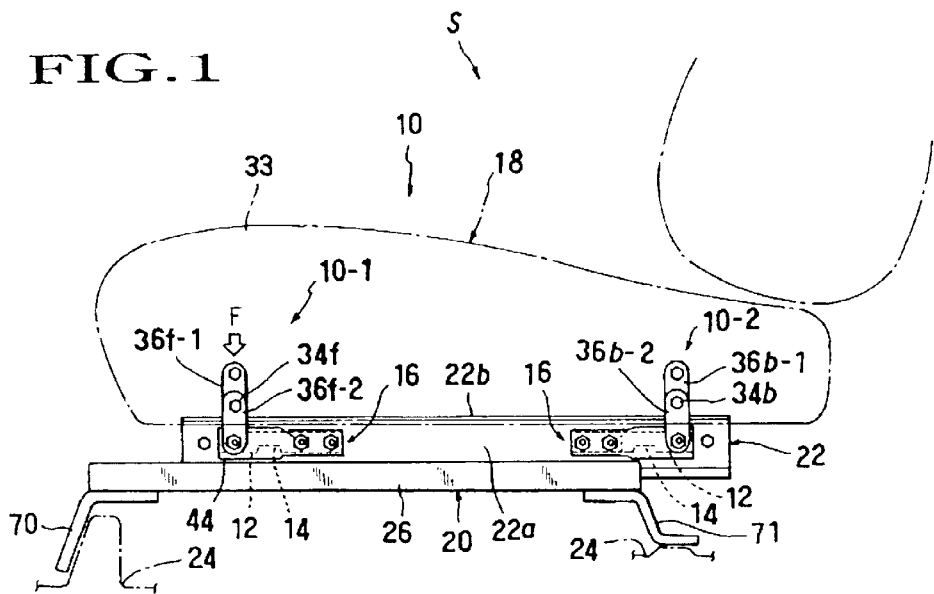
FIG. 1 is a schematic side elevational view of a vehicle seat and a load detection structure of the present invention applied thereto.

Referring to FIGS. 1 to 6, there is illustrated one exemplary mode of a load detection structure as generally designated by (10) which is applied to a sliding seat (S) for vehicle or automobile. In brief, as viewed from FIG. 1, the load detection structure (10) includes a load detection means (16) which basically comprises a strain block member (12) and a strain gauge (14), and such load detection means (16) is provided laterally of an upper rail (22) of each of a pair of spaced-apart slide rail devices (20) which can be best seen by the one-dot chain lines from FIG. 4.

Each slide rail device (20) is of such known structure comprising a stationary lower rail (26) and a movable upper rail (22) slidably fitted in the lower rail (26) via steel balls (28) and rollers (29) (see FIG. 6). In the illustrated embodiment, the upper rail (22) is formed with an upwardly extending connection portion (22b) having a vertical lateral surface (22a). The upwardly extending connection portion (22b) is normally adapted for connection with the bottom side or frame (not shown) of the seat cushion (18).

Designations (70) (71) denote a forward leg member and a backward leg member, respectively. As shown in FIG. 1, the lower rail (26) is firmly connected, via those forward and backward leg members (70) (71), with the floor (24).

Though not shown clearly, in fact, both slide rail device (20) and two leg members (70, 71) are each provided in pair. Namely, a pair of slide rail devices (20) are provided under the bottom of seat cushion (18) and a pair of two leg members (70, 71) are provided for supportively receiving those two slide rail devices (28) thereon, respectively.

According to the embodiment shown in FIG. 1, the load detection structure (10) is divided into forward and rearward load detection structures (10-1) (10-2) which are respectively disposed in the forward and rearward regions of a mutually mated pair of lower rails (22). Therefore, as far as the present embodiment is concerned, as understandable from FIGS. 1 and 4, it follows that a pair of forward load detection structures (10-1) are so arranged forwardly of the seat (S) that they are respectively disposed in the forward regions of left-side connection portion (22b) of upper rail (22) and in the forward regions of right-side connection portion (22b) of upper rail (22) and support leg member (34), whereas a pair of rearward load detection structures (10-2) are so arranged rearwardly of the seat (S) that they are respectively disposed in the rearward regions of right-side connection portion (22b) of lower rail (22) and in the rearward regions of left-side connection potion (22b) of lower rail (26). Since all the load detection structures (10-1) (10-2), the pair of slide rail devices (28) and the leg members (70, 71) are identical in structure to one another, description will be made only of one forward load detection structure (10-1) in one of the two slide rail devices (20) and one pair of the two leg members (28), for the sake of simplicity.

Figure 2:
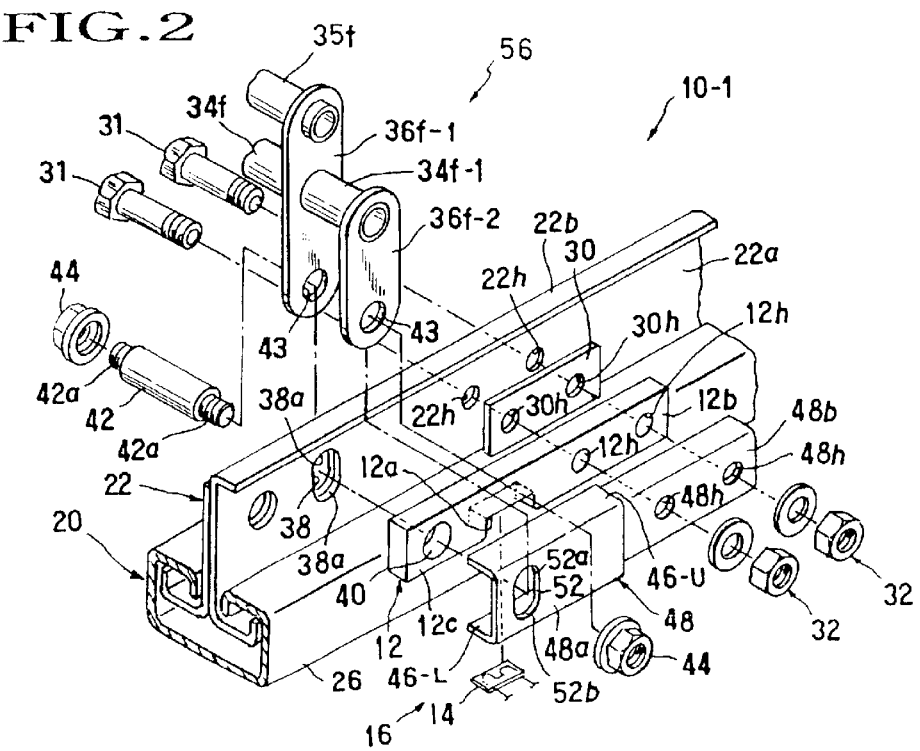
FIG. 2 is a partly broken and exploded perspective view of a principal part of the load detection structure.

The strain block member (12), a main part of the load detection means (16), is generally of an oblong configuration that extends its elongated body in the longitudinal direction thereof and formed from a rigid yet resiliently deflectable material having a property that tends to recover into its original shape even when subjected to deformation or deflection by a great external load applied thereto. Preferably, the strain block member (12) may be formed from a spring steel material. As best shown in FIG. 2, the block member (12) is so formed to have, defined therein, a forward movable end portion (12c), a rearward base portion (12b), and a narrow intermediate portion (12a) formed relatively thin heightwise between those two portions (12c) (12b). Further, formed in the forward end portion (12c) is a horizontally elongated connecting hole (40), whereas, formed in the rearward base portion (12b) are a pair of spaced-apart securing holes (12h) (12h).

As will become apparent later, the narrow intermediate portion (12a) is a point providing a vertical resilient bendability of the block member (12) relative to the rearward base portion (12b). Fixedly mounted on the recessed lower area of the narrow intermediate portion (12a) is the strain gauge (14) for detecting an amount of strain or deflection caused in the block member (12). The strain gauge (14) is of a known type comprising an electrical insulating thin plate which is resiliently bendable, and a metallic resistance wire embedded sinuously in that thin plate (58). The strain gauge (14) is not imitative, but may be formed in any otherwise manner without using such resistance wire insofar as it can detect the deflection of block member (12). Also, the strain gauge (14) may be fixed on the upper side of the narrow intermediate portion (12a) opposite to the recessed lower side thereof.

As shown in FIG. 2, formed in the vertically extending connection portion (22b) of upper rail (22) are a vertically elongated hole (38) and a pair of securing hole (22h) (22h) which are in correspondence with the afore-stated two securing holes (22h) (22h) of the strain block member (12), respectively.

In accordance with the present invention, there is provided a limiter member (48) for limiting vertical deflection of the strain block member (12), the limiter member (48) being of a generally channel cross-section which has a vertical plate body and a pair of horizontally extending plate portions, as illustrated. This limiter member (48) is formed with a limiter portion (48a) and a securing portion (48b) which is smaller in size than the limiter portion (48a) and also generally equal in size to the strain block member (12).

In the limiter member (48), the two horizontally extending plate portions constitute an upper limit piece (46-U) and a lower limit piece (46-L), respectively, for a vertical limit purpose to be set forth later. Further, with regard to such limiter member (48), formed in the vertical wall of the (48) is a vertically elongated hole (52) which is equal in size to the aforementioned vertically elongated hole (38), and on the other hand, formed in the vertical wall of the securing portion (48b) are a pair of securing holes (48h) (48h) which are in correspondence with the foregoing two securing holes (12h) (12h) of the strain block member (12), respectively.

Designation (30) denotes a reinforcement plate in which are also formed a pair of securing hoes (30h) (30h) in correspondence with the two securing holes (12h) (12h) of strain block member (12), respectively.

In assembly, at first, two securing bolts (31) (31) are inserted through all the aligned pair of securing holes (22h) (30h) (12h) and (48h), respectively, and threadedly engaged in two securing nuts (32) (32), respectively, thereby firmly fastening both of the strain block member (12) and limiter member (48), via the reinforcement plate (30), to the vertical lateral wall (22a) of the vertically extending connection portion (22b) associated with the upper rail (22). It is noted here that the vertically elongated hole (52) of the limiter member (48) is completely aligned with the vertically elongated hole (38) of the vertically extending connection portion (22b), and that the horizontally elongated connecting hole (40) of the strain block member is positioned at a point corresponding to a center of those two vertically elongated holes (52) (38). Accordingly, it is seen that the strain block member (12) is, at the securing portion (12b) thereof, firmly fastened at the two points (31, 31) to the vertical lateral wall (22a) such that the limiter member (48) substantially covers a whole of the strain block member (12).

With this structure using such reinforcement plate (30), only the strain block member securing portion (12b) is fixed to the vertical lateral wall (22a) of upper rail (22) and there is no contact between the forward movable end portion (12c) of strain block member (12) and that vertical lateral wall (22a). Thus, the narrow intermediate portion (12a) is free to deflect vertically relative to that fixed securing portion (12b), thereby allowing the strain block member end portion (12c) to move in substantially the vertical direction along the circumference of a circle whose center is at a central point of the narrow intermediate portion (12a). Strictly stated, the strain block member end portion (12c) is subjected to a slight circular movement. In this connection, the horizontally elongated hole (30) allows horizontal or diameter-wise movement of a connecting pin (42) due to such slight circular movement, the connecting pint (42) passing through both vertically and horizontally elongated holes (38, 52, 30) as will be described later, so that the end portion (12c) is smoothly moved in substantially the vertical direction.

Figure 4:
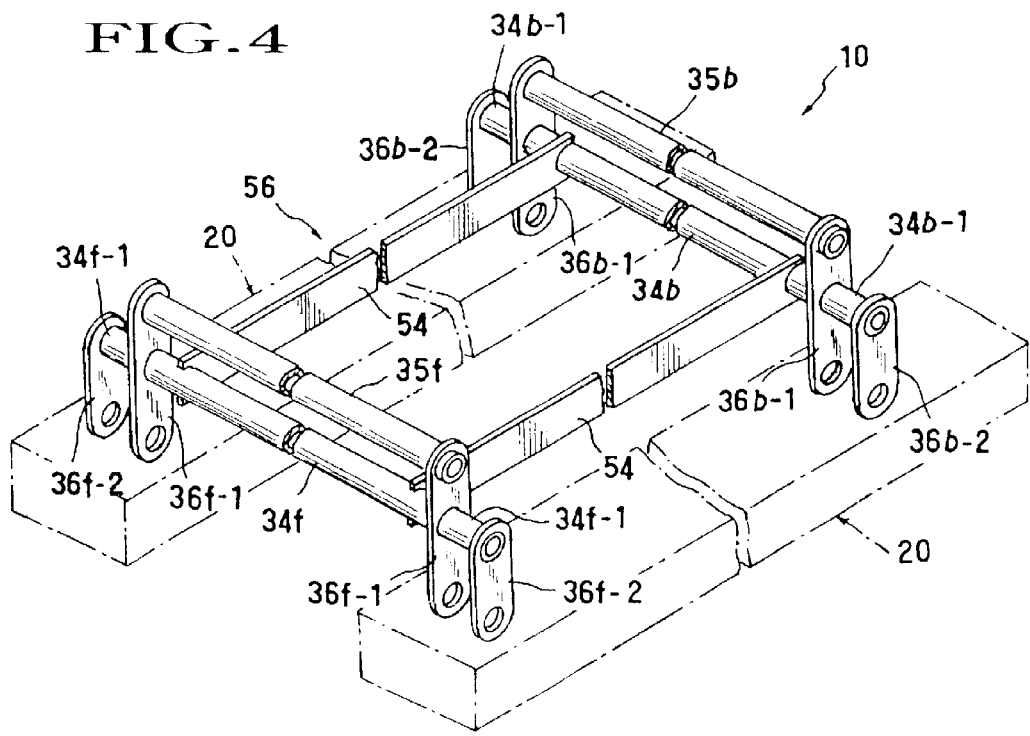
FIG. 4 is a partly broken schematic perspective of a link assembly to be provided in the load detection structure.

As previously stated, a pair of forward load detection structures (10-1) are arranged forwardly of the seat (S) and a pair of rearward load detection structures (10-2) are arranged rearwardly of the seat (S) as understandable from FIGS. 1 and 4. In view of such four load detection structures (10-1, 10-2) in the seat (S), in accordance with the present invention, there is provided a link assembly (56) assuming a generally rectangular configuration, which connects those four load detection structures with one another in an integral manner. Namely, there are provided a pair of forward and backward transverse link elements (34f) (34b) and a pair of spaced-apart longitudinal link elements (54) (54). As shown in FIG. 4, both forward ends of the two longitudinal link elements (54) are fixedly connected with the forward transverse link element (34f), while on the other hand, both backward ends of those two link elements (54) are fixedly connected with the backward transverse link element (34b), thereby basically constituting a generally rectangular link assembly on the whole. As shown, both two end portions of the forward transverse link element (34f) project outwardly from the link assembly to provide a pair of left end right projected regions (34f-1) (34f-1), while both two end portions of the backward transverse link element (34b) project outwardly from the link assembly to provide a pair of left and right projected regions (34b-1) (34b-1).

In this context, designations (36f-1) (36f-2) respectively denote a first vertical link piece and a second vertical link piece, which are disposed at the forward transverse link element (34f), and, likewise, designations (34b-1) (34b-1) respectively denote a first vertical link piece and a second vertical link piece, which are disposed at the backward transverse link element (34b). As can be seen in FIG. 4, the first vertical link piece (36f-1 or 36b-1) is longer than the second vertical link piece (36f-2 or 36b-2) and fixed at its intermediate area to the projected regions (34f-1 or 34b-1). The second vertical link piece (36f-2 or 36b-2) is fixed at its upper end to the distal end of the projected region (34f-1 or 34b-1). Hence, the first and second vertical link pieces (36f-1) (36f-2) at the forward transverse link element (34f) extend downwardly from the projected region (34f-1) of the same link element (34f), whereas the first and second vertical link pieces (36b-1) (36b-2) at the backward transverse link element (34b) extend downwardly from the projected region (34b-1) of the same link element (34b). In other words, those first and second vertical link pieces (36f-1) (36f-2) constitute a pair of spaced-apart first and second pendent link pieces, and those particular two pendent link pieces are disposed at each of the four corner points of the link assembly (56) in a manner dependent therefrom. Hereinafter, for the sake of simplicity in description, the terminology, "a pair of spaced-apart first and second pendent link pieces (36f-1) (36f-2)", will be used. Also, as can be seen in FIG. 4, a forward connecting rod (35f) is extended between two upper ends respectively of the two first pendent link pieces (36f-1) (36f-1), while a backward connecting rod (35b) is extended between two upper ends respectively of the two second pendent link pieces (36b-1) (36b-1). Both forward and backward connecting rods (35f) (35b) are adapted to connect the link assembly (or both load detection structure (10) and slide rail devices (22)) with the bottom side of the seat cushion (18), as understandable from both FIGS. 1 and 4.

Referring now to FIG. 2, description will be made about how the pair of first and second dependent link pieces (36f-1) (36f-2) are connected with the previously described strain block member (12) and limiter member (48) which have been fixed via reinforcement plate (30) to the vertical lateral wall (22a) of the upper rail upward extension portion (22b) It is noted that this description is dedicated only to one left-side pair of first and second dependent link pieces (36f-1) (36f-2) as viewed from FIG. 2 for the sake of simplicity in description. The same goes for another remaining three pairs of first and second dependent link pieces (36f-1, 36f-2) (36b-1, 36b-2).

At first, one pair of spaced-apart first and second dependent link pieces (36f-1) (36f-2) are brought to the upward extension portion (22b) in such a manner as to bridge over the latter. In other words, the first and second pendent link pieces (36f-1) (36f-2) are disposed symmetrically relative to and on the opposite sides of the upper extension portion (22b) such that both two holes (43) (43) respectively of the two link pieces (36f-1) (36f-2) are coaxially aligned with all the aforementioned aligned connecting hole (40) and two vertically elongated holes (38) (52).

Then, a connecting pin (42) is inserted through all the thus-aligned holes (43, 40, 38 and 52). Thereafter, one securing nut (44) and another securing nut (44) are threadedly engaged over one and another threaded end portions (42a) (42a) of the connecting pin (42), respectively, whereupon, as seen from FIG. 6, the first and second pendent link pieces (36f-1) (36f-2) are firmly connected with the forward movable end portion (12c) of strain block member (12). Namely, the link assembly (56) is connected with and supported on that forward movable end portion (12c).

It is appreciated that, when the seat (S) or the link assembly (56) is moved in a vertical direction toward and away from the floor (24), the connecting pin (42) is allowed to move in the likewise vertical direction along the two vertically elongated holes (38) (52), and therefore, with such vertical movement of the seat (S), the narrow intermediate portion (12a) of strain block member (12) is deflected vertically relative to the securing portion (12b) fixed to the upper rail upward extension portion (22), which in turn causes simultaneous corresponding vertical movement of the forward movable end portion (12c) of strain block member (12).

Figure 3:
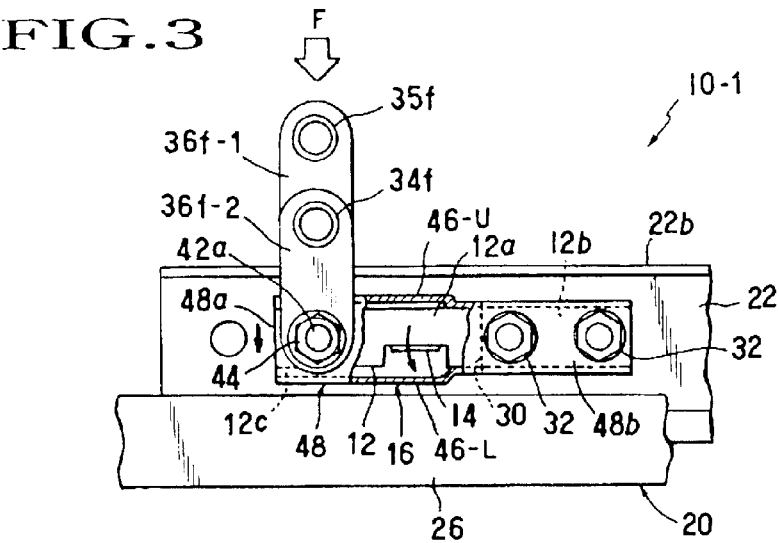
FIG. 3 is a partly broken fragmentary side elevation view of the load detection structure.

Accordingly, as understandable from FIGS. 1 and 3, when a load (F) or the weight of a driver or passenger is applied to the seat cushion (18) of the seat (S), both connecting pin (42) and two pendent link pieces (36f-1) (36f-2) are lowered to a certain degree corresponding to the passenger's weight, which simultaneously causes downward deflection of the narrow intermediate portion (12a) of strain block member (12). With such deflection, the strain gauge (14) attached tight on that narrow intermediate portion (12a) is simultaneously deflected in the same downward direction, thereby detecting an amount of deflection corresponding to the passenger's weight and emitting a certain electric signal therefrom via lead wires. The electric signal is a basis for determining whether an occupant on the seat (S) is an adult or a child. In this connection, while not shown, the strain gauge (14) is electrically connected with a control circuit associated with an air bag, for instance. In that case, the control circuit determines whether the seat occupant is an adult or a child according to the kind of signal inputted therein and causes a proper inflation of the air bag. It is also appreciated that the load detection means (16) is disposed directly on the lateral wall (22a) of upper rail upward extension portion (22b), which eliminates the necessity for interposing other support parts or elements between the load detection means (16) and the upper rail (22) to support the load detection means (16). This advantageously maintains the position of the seat (S) at a low point, thus not resulting in increase of the seat position.

In accordance with the present invention, the vertical movement of the forward movable end portion (12c) of strain block member (12) is limited by the upper and lower limited pieces (46-U) (46-L). Normally, as can be seen from FIGS. 1 and 5 (C), when a normal weight of occupant on the seat (S) is applied to the forward movable end portion strain block member (12) through the link assembly (56) and the first and second pendent link pieces (36f-1) (36f-2), the narrow intermediate portion (12a) is deflected vertically within a height-wise spacing defined by the upper and lower limit pieces (46-U) (46-L) to give a normal deflection amount which is detectable by the strain block member (12). This is because, as shown in FIG. 5, an upper limited gap (50-U) is given between the upper limit piece (46-U) and the upper side of the forward movable end portion (12c) while a lower limited gap (50-L) is given between the lower limited piece (46-L) and the lower side of the forward movable end portion (12c). If an excessive downward load greater than the normal downward load (F) is applied to the seat (S), causing the strain block member (12) to deflect downwardly to a level in excess of the lower limited space (50-L), the forward end portion (12c) of strain block member (12) is brought to contact with the lower limit piece (46-L), thereby protecting the strain block member intermediate portion (12c) against undesired downward deflection in excess of tolerable lower range in which the strain gauge (14) can work for precise detection of the downward deflection amount of that particular area (12c). Such contact between the strain block member (12) and lower limit piece (46-L) quickly establishes a load transmission passage through which a part of the excessive great load is allowed to quickly transmit from the limit piece (46-L) to the upper rail (22) whereby an excessive amount of the load is escaped through the slide rail device (20) and support leg members (70) (71) to the floor (24). Further, if a more excessive load is applied to the seat (S), tending to damage and break both strain block member (12) and lower limit piece (45-L), then the connecting rod (42) is brought to contact with both lower edges (38b) and (52b) respectively of the two vertically elongated holes (38) and (52), whereby such more excessive load is quickly escaped through both connecting rod (42) and slide rail device (20) to the support leg members (70) (71) and thus to the floor (24). Accordingly, a whole of the strain block member (12) is protected against damage and deformation.

By contrast, if an excessive upward force is applied to the seat (S), causing the strain block member (12) to deflect upwardly to a level in excess of the upper limited space (50-U), the forward end portion (12c) of strain block member (12) is brought to contact with the upper limit piece (46-U), thereby protecting the strain block member intermediate portion (12c) against undesired upward deflection in excess of tolerable upper range in which the strain gauge (14) can work for precise detection of the upward deflection amount of that particular area (12c). Such contact between the strain block member (12) and upper limit piece (46-U) quickly establishes a load transmission passage through which a part of the excessive great load is allowed to quickly transmit from the limit piece (46-U) to the upper rail (22), whereby an excessive amount of the load is escaped through the slide rail device (20) and support leg members (70) (71) to the floor (24). If a more excessive upward force is applied to the seat (S), tending to damage and break both strain block member (12) and upper limit piece (46-U), then the connecting rod (42) is brought to contact with both upper edges (38a) and (52a) respectively of the two vertically elongated holes (38) and (52), whereby such more excessive upward force is quickly escaped through both connecting rod (42) and slide rail device (20) to the support leg members (70) (71) and thus to the floor (24). Accordingly, a whole of the strain block member (12) is protected against damage and deformation.

With the above-described structure, any excessive great load that might exceed the tolerable strength of both strain block member (12) and will be escaped through the slide rail device (20) to the floor (24), thereby insuring to protect the block member (12) against damage. In particular, the narrow intermediate area (12c), i.e. a most fragile portion of the strain plate member (12), is completely protected against damage and breakage.

The upper and lower limit pieces (46-U) (46-L) may be formed on the vertical lateral wall (22a) of upper rail upward extension portion (22b). But, the formation of those two pieces (46-U) (46-L) in the limiter member (48) configured to cover the strain block member (12) is advantageous in that it is easy to position and secure strain block member (12) on that vertical lateral wall (22a) without any strict care for precisely defining the upper and lower limited gaps (50-U) (50-L) relative to the forward end portion (12c) of strain block member (12).

Further, in the illustrated embodiment, the generally rectangular configuration of link assembly (56) is advantageous in that all the pair of first and second pendent link pieces (36f-1, 36f-2, 36b-1 and 36b-2) are fixed at the four corners on a same level and position, hence allowing all the four sets of those paired first and second pendent link pieces to be easily positioned at a proper point relative to respective four strain block members (12) and then connected herewith via the corresponding four connecting rods (42).

While having described the present invention thus far, it should be understood that the invention is not limited to the illustrated embodiment, but any other modification, replacement and addition may be applied thereto without departing from the appended claims. For example, the load detection structure may be provided in any other kind of seat for use in a train, airplane and vessels.

What is claimed is:

1. In combination with a vehicle seat provided with a pair of spaced-apart slide rail devices each including a lower rail adapted to be fixed to a floor and an upper rail slidably fitted in said lower rail, said upper rail having a lateral side,
a load detection structure comprising:
 a load detection means for detecting a load applied to said vehicle seat, said load detecting means including:
  a block element of a generally oblong shape having a rigid yet resiliently deflectable property that tends to recover into original shape; said block element having a movable portion; a securing portion; and a deflectable area defined between said movable portion and securing portion, wherein said movable portion is formed with a horizontally elongated hole therein; and
  a strain gauge means provided on said deflectable area;
 said load detection means being arranged laterally of said upper rail such that said securing portion of said block element is fixedly secured to said lateral side of the upper rail;
 a vertically elongated hole formed in said lateral wall of the upper rail;
 a connecting pin; and
 a pair of spaced-apart link pieces so provided below said seat as to extend downwardly therefrom, with such an arrangement that said pair of spaced-apart link pieces being disposed symmetrically relative to and on the opposite sides of both said upper rail and said movable portion of said block element,
wherein one of said pair of spaced-apart link pieces being connected with another of said pair of spaced-apart link pieces in such a manner that said connecting pin is secured in said hole of said movable portion while being slidably inserted through said vertically elongated hole,
wherein said pair of spaced-apart link pieces are supported by said movable portion of the block element so that a load applied to the seat is transmitted to said movable portion, thereby causing deflection of the delectable area of the block element, in response to which, said strain gauge means detects an amount of the deflection.

2. The load detection structure as claimed in claim 1, wherein said deflectable area is defined as a height-wise thin area by reducing a height-wise thickness of a portion of said block element corresponding thereto.

3. The load detection structure as claimed in claim 1, wherein a reinforcement plate is provided between said lateral wall of said upper rail and said securing portion of said block element, such that a spacing is given between said movable portion of the block element and said lateral wall of the upper rail.

4. The load detection structure as claimed in claim 1, which further includes a pair of first and second limit pieces, which are respectively defined at a point adjacent to one side of said movable portion of said block element with a first gap therebetween and at another point adjacent to another side of said movable portion with a second gap therebetween, said pair of first and second limit elements being adapted to limit the vertical movement of said movable portion of said block element, while allowing said vertical movement within a limited space including said first and second gaps.

5. The load detection structure as claimed in claim 1, wherein a pair of first and second limit pieces are provided, which are respectively defined at a point adjacent to one side of said movable portion of said block element and at another point adjacent to another side of said movable portion, said pair of first and second limit elements being adapted to limit vertical movement of said movable portion of said block element, wherein there is provided a limiter member of generally channel cross-section having first and second horizontal portions formed therein and being so configured as to cover said block element, and wherein said pair of first and second limit pieces are respectively formed integrally in said first and second horizontal portions, and wherein said limiter member is securely connected with said lateral side of said upper rail, covering said block element.

6. The load detection structure according to claim 5, wherein said limiter member is formed with a horizontally elongated hole identical in size to said horizontally elongated hole of said movable portion of said block element, and wherein said vertically elongated hole of said limiter member is aligned with said horizontally elongated hole of said block element.

7. The load detection structure as claimed in claim 1, which further includes a link assembly comprising four spaced-apart link elements in a generally rectangular shape having four corner portions, said link assembly being provided between said seat and said pair of spaced-apart slide rail devices, with such an arrangement that said load detection means are connected integrally with said four corner portions of said link assembly, while being disposed at one end portion of each of said pair of slide rail devices and disposed also at another opposite end portion of each of said pair of slide rail devices.

* * * * *